(12) United States Patent
Bernard et al.

(10) Patent No.: US 8,652,684 B2
(45) Date of Patent: Feb. 18, 2014

(54) COMPOSITION FOR NEGATIVE ELECTRODE OF ALKALINE ELECTROLYTE BATTERY

(75) Inventors: Patrick Bernard, Bordeaux (FR); Bernard Knosp, Bordeaux (FR); Michelle Baudry, Eysines (FR)

(73) Assignee: Saft Groupe SA, Bagnolet (FR)

( * ) Notice: Subject to any disclaimer, the term of this patent is extended or adjusted under 35 U.S.C. 154(b) by 1749 days.

(21) Appl. No.: 11/850,891

(22) Filed: Sep. 6, 2007

(65) Prior Publication Data

US 2008/0070117 A1 Mar. 20, 2008

(30) Foreign Application Priority Data

Sep. 15, 2006 (FR) ..................... 06 08093

(51) Int. Cl.
*H01M 6/00* (2006.01)
*H01M 10/00* (2006.01)
*H01M 4/02* (2006.01)
*H01M 4/13* (2010.01)

(52) U.S. Cl.
USPC ...... 429/218.2; 429/122; 429/209; 429/218.1

(58) Field of Classification Search
USPC .................................................. 429/218.2
See application file for complete search history.

(56) References Cited

U.S. PATENT DOCUMENTS

| | | | |
|---|---|---|---|
| 6,322,926 B1* | 11/2001 | Kasashima et al. | 429/218.2 |
| 2004/0134569 A1 | 7/2004 | Yasuoka et al. | |
| 2005/0100789 A1* | 5/2005 | Murata et al. | 429/218.2 |
| 2006/0057019 A1* | 3/2006 | Young et al. | 420/455 |
| 2006/0266219 A1* | 11/2006 | Ovshinsky et al. | 96/108 |

FOREIGN PATENT DOCUMENTS

| | | |
|---|---|---|
| EP | 1727229 A | 11/2006 |
| JP | 10106550 A | 4/1998 |
| JP | 2001316744 A | 11/2001 |
| JP | 2001325957 A | 11/2001 |
| JP | 2002069554 A | 3/2002 |
| JP | 2005108646 | 4/2005 |

OTHER PUBLICATIONS

Kaiya et al., "Improvement in cycle life performance of high capacity nickel-metal hydride battery", Journal of Alloys and Compounds, Dec. 15, 1995, pp. 598-603, vol. 231, XP004077291.*
European Search Report, dated Nov. 30, 2007.
H. Kaiya, et al., "Improvement in cycle life performance of high capacity nickel-metal hydride battery", Journal of Alloys and Compounds, Dec. 15, 1995, pp. 598-603, vol. 231, XP004077291.

* cited by examiner

*Primary Examiner* — Barbara Gilliam
*Assistant Examiner* — Steven Scully
(74) *Attorney, Agent, or Firm* — Sughrue Mion, PLLC

(57) ABSTRACT

The invention proposes a composition comprising:
  a) a hydrogen-fixing alloy of formula $R_{1-t}Mg_tNi_{s-z}M_z$
  in which:
    R represents one or more elements chosen from the group comprising La, Ce, Nd and Pr;
    M represents one or more elements chosen from the group comprising Mn, Fe, Al, Co, Cu, Zr and Sn;
    $0.1 \leq t \leq 0.4$;
    $3.0 \leq s \leq 4.3$;
    $z \leq 0.5$;
  b) a manganese compound in a proportion such that the mass of manganese represents from 1 to 5.5% of the mass of the alloy,
  c) an yttrium compound in a proportion such that the mass of yttrium represents from 0.1% to 2% of the mass of the alloy.

The invention also relates to an anode comprising the composition according to the invention.
The invention also relates to an alkaline electrolyte battery comprising said at least one anode.

17 Claims, No Drawings

COMPOSITION FOR NEGATIVE ELECTRODE OF ALKALINE ELECTROLYTE BATTERY

TECHNICAL FIELD

The invention relates to a composition comprising an $AB_t$ type alloy with $3.0 \leq t \leq 4.3$. The invention also relates to an anode (negative electrode) comprising said composition, and an alkaline electrolyte battery comprising said anode.

STATE OF THE ART

Portable electric and electronic applications, such as for example wireless tools, have an increasing energy requirement. An alkaline battery comprising an anode based on an $AB_5$ type hydrogen-fixing metal and a cathode based on nickel hydroxide does not satisfactorily respond to the development of this energy requirement. In fact, an $AB_5$ type alloy possesses an electrochemical capacity limited to 300-320 mAh/g.

Attempts to optimize the volume capacity of such a battery show that it is not possible to increase the capacity without reducing its lifetime.

Conversely, it is not possible to increase the lifetime of such a battery without reducing its capacity.

In order to increase the volume capacity, $R_{1-x}Mg_xB_y$ type compositions with y comprised between approximately 3 and 4 have been studied.

For example, the Patent Application US 2004/0134569 describes an $R_{1-x}Mg_xB_y$ type alloy with $2.8 \leq y \leq 3.9$. It is represented by the formula:

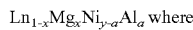

$Ln_{1-x}Mg_xNi_{y-a}Al_a$ where

Ln is at least one rare earth element,
$0.05 \leq x < 0.20$
$2.8 \leq y \leq 3.9$ and
$0.10 \leq a \leq 0.25$.

This alloy is used as negative active material for an alkaline battery.

The Patent Application US 2005/0100569 describes an $R_{1-x}Mg_xB_y$ type alloy with $3.0 \leq y \leq 3.96$. It is represented by the formula:

$R_{1-x}Mg_xNi_yAl_zM_a$ where

R is at least one rare earth element,
$0.10 \leq x \leq 0.30$;
$2.8 \leq y \leq 3.6$;
$0 \leq a \leq 0.30$ and
$3.0 \leq y+z+a \leq 3.6$.

This alloy is used as active material for a negative electrode of an alkaline battery. Manganese, in a quantity of less than 1% by weight of the weight of the alloy, is present in the negative electrode.

The document JP 2002-069554 describes an $R_{1-x}Mg_xB_y$ type alloy with $2.9 \leq y \leq 3.5$. It is represented by the formula:

$R_{1-a}Mg_aNi_bCo_cM_d$ where

R comprises at least two rare earth elements;
M represents one or more elements chosen from Mn, Fe, V, Cr, Nb, Al, Ga, Zn, Sn, Cu, Si, P and B; and
$0.15 < a < 0.35$;
$0 \leq c \leq 1.5$;
$0 \leq d \leq 0.2$ and
$2.9 < b+c+d < 3.5$.

This alloy is used as negative active material for an alkaline battery.

The $R_{1-x}Mg_xB_y$ type alloys with $3<y<4$ have an initial capacity of approximately 350 mAh/g, which is greater than the capacity of an $AB_5$ alloy, which is of the order of 300 to 320 mAh/g. However, the lifetime of such alloys is limited by the appearance of micro short circuits during the ageing of the battery which lead to a deterioration in the performance of the battery in terms of self-discharge.

A composition for a negative electrode of an alkaline battery is therefore sought which offers to this battery a longer lifetime and at the same time a lower self-discharge after a use in cycling.

SUMMARY OF THE INVENTION

The invention also relates to the use of a composition comprising:

a) a hydrogen-fixing alloy of formula $R_{1-t}Mg_tNi_{s-z}M_z$ in which:
R represents one or more elements chosen from the group comprising La, Ce, Nd and Pr;
M represents one or more elements chosen from the group comprising Mn, Fe, Al, Co, Cu, Zr and Sn;
$0.1 \leq t \leq 0.4$;
$3.0 \leq s \leq 4.3$;
$z \leq 0.5$;

b) a manganese compound in a proportion such that the mass of manganese represents from 1 to 5.5% of the mass of alloy, c) an yttrium compound in a proportion such that the mass of yttrium represents from 0.1% to 2% of the mass of the alloy.

According to an embodiment, $0.1 \leq t \leq 0.25$ and $3.5 \leq s \leq 3.8$. In this embodiment $M=Mn_xAl_yM'_u$ where M' represents one or more elements chosen from the group comprising Fe, Co, Cu, Zr and Sn;
$x \leq 0.20$;
$0.05 \leq y \leq 0.20$;
$u \leq 0.20$ and
$x+y+u \leq 0.5$.

According to an embodiment, the hydrogen-fixing alloy is cobalt-free.

According to an embodiment, $0.1 \leq t \leq 0.25$, $3.5 \leq s \leq 3.8$ and the hydrogen-fixing alloy is cobalt-free. In this embodiment, $M=Mn_xAl_yM'_u$ where M' represents one or more elements chosen from the group comprising Fe, Cu, Zr and Sn;
$x \leq 0.20$;
$y \leq 0.20$;
$u \leq 0.20$ and
$x+y+u \leq 0.5$.

According to an embodiment, the mass of manganese represents between 1.3% and 5% of the mass of the alloy, preferably also, between 2% and 3.5% of the mass of the alloy.

According to an embodiment, the mass of yttrium represents between 0.2% and 1% of the mass of the alloy, preferably also, between 0.2% and 0.7% of the mass of the alloy.

According to an embodiment, the equilibrium hydrogen pressure with the alloy, for 1% by mass of hydrogen inserted, is less than 1.5 bar.

According to an embodiment, the yttrium compound is yttrium oxide $Y_2O_3$.

According to an embodiment, the manganese-based compound is manganese oxide MnO.

According to an embodiment, the manganese compound is a hydrogen-fixing alloy. This hydrogen-fixing alloy can be of $AB_5$ type where:

A comprises one or more elements chosen from the lanthanide group;

B comprises one or more elements chosen from the group comprising Ni, Co, Mn and Al.

According to an embodiment, the size of the hydrogen-fixing alloy particles is characterized by a $Dv_{50\%}$ of 30 to 120 μm, preferably from 50 to 100 μm.

The invention also relates to an anode comprising said composition.

The invention also relates to an alkaline electrolyte battery comprising said anode.

DETAILED DISCLOSURE OF EMBODIMENTS OF THE INVENTION

The invention proposes a composition for a negative electrode of a nickel metal hydride alkaline battery, comprising:

a) a hydrogen-fixing alloy corresponding to the formula:

$$R_{1-t}Mg_tNi_{s-z}M_z, \text{ where}$$

R represents at least one element chosen from the group comprising La, Ce, Nd and Pr, M represents at least one element chosen from the group comprising Mn, Fe, Al, Co, Cu, Zr, Sn;
with $0.1 \le t \le 0.4$
$3.0 \le s \le 4.3$;
$z \le 0.5$.

b) a manganese compound in a proportion such that the mass of manganese represents from 1 to 5.5% of the mass of alloy, c) an yttrium compound in a proportion such that the mass of yttrium represents from 0.1% to 2% of the mass of the alloy.

Preferably, the mass of manganese represents between 1.3% and 5% of the mass of the alloy, preferably also, between 2% and 3.5% of the mass of the alloy.

Preferably, the mass of yttrium represents between 0.2% and 1% of the mass of the alloy, preferably also, between 0.2% and 0.7% of the mass of the alloy.

According to an embodiment, the invention relates to a composition for a negative electrode of a nickel metal hydride alkaline battery, comprising:

a) a hydrogen-fixing alloy corresponding to the formula:

$$R_{1-t}Mg_tNi_{s-z}M_z, \text{ where}$$

R represents at least one element chosen from the group comprising La, Ce, Nd and Pr;

M represents at least one element chosen from the group comprising Mn, Fe, Al, Co, Cu, Zr, Sn;
with $0.1 \le t \le 0.25$;
$3.5 \le s \le 3.8$;
$z \le 0.5$.

b) a manganese compound in a proportion such that the mass of manganese represents from 1 to 5.5% of the mass of alloy, c) an yttrium compound in a proportion such that the mass of yttrium represents from 0.1% to 2% of the mass of the alloy.

Preferably, the mass of manganese represents between 1.3% and 5% of the mass of the alloy, preferably also, between 2% and 3.5% of the mass of the alloy.

Preferably, the mass of yttrium represents between 0.2% and 1% of the mass of the alloy, preferably also, between 0.2% and 0.7% of the mass of the alloy.

According to an embodiment, the invention relates to a composition for a negative electrode of a nickel metal hydride alkaline battery, comprising:

a) a hydrogen-fixing alloy corresponding to the formula:

$$R_{1-t}Mg_tNi_{s-x-y-u}Mn_xAl_yM_u, \text{ where}$$

R represents at least one element chosen from the group comprising La, Ce, Nd and Pr;

M represents at least one element chosen from the group comprising Fe, Co, Cu, Zr and Sn; with
$0.1 \le t \le 0.25$
$x \le 0.20$;
$0.05 \le y \le 0.20$;
$u \le 0.20$;
$x+y+u \le 0.5$ and
$3.5 \le s \le 3.8$ b) a manganese compound in a proportion such that the mass of manganese represents from 1 to 5.5% of the mass of alloy, c) an yttrium compound in a proportion such that the mass of yttrium represents from 0.1% to 2% of the mass of the alloy.

Preferably, the mass of manganese represents between 1.3% and 5% of the mass of the alloy, preferably also, between 2% and 3.5% of the mass of the alloy.

Preferably, the mass of yttrium represents between 0.2% and 1% of the mass of the alloy, preferably also, between 0.2% and 0.7% of the mass of the alloy, According to an embodiment, the invention proposes a composition for a negative electrode of nickel metal hydride alkaline battery, comprising:

a) a cobalt-free hydrogen-fixing alloy corresponding to the formula:

$$R_{1-t}Mg_tNi_{s-z}M_z, \text{ where}$$

R represents at least one element chosen from the group comprising La, Ce, Nd and Pr;

M represents at least one element chosen from the group comprising Mn, Fe, Al, Cu, Zr, Sn;
with $0.1 \le t \le 0.4$;
$3.0 \le s \le 4.3$;
$z \le 0.5$.

b) a manganese compound in a proportion such that the mass of manganese represents from 1 to 5.5% of the mass of alloy, c) an yttrium compound in a proportion such that the mass of yttrium represents from 0.1% to 2% of the mass of the alloy.

Preferably, the mass of manganese represents between 1.3% and 5% of the mass of the alloy, preferably also, between 2% and 3.5% of the mass of the alloy.

Preferably, the mass of yttrium represents between 0.2% and 1% of the mass of the alloy, preferably also, between 0.2% and 0.7% of the mass of the alloy.

According to an embodiment, the invention relates to a composition for negative electrode of nickel metal hydride alkaline battery, comprising:

a) a cobalt-free hydrogen-fixing alloy and corresponding to the formula;

$$R_{1-t}Mg_tNi_{s-z}M_z, \text{ where}$$

R represents at least one element chosen from the group comprising La, Ce, Nd and Pr;

M represents at least one element chosen from the group comprising Mn, Fe, Al, Cu, Zr, Sn;
with $0.1 \le t \le 0.25$;
$3.5 \le s \le 3.8$;
$z \le 0.5$.

b) a manganese compound in a proportion such that the mass of manganese represents from 1 to 5.5% of the mass of alloy, c) an yttrium compound in a proportion such that the mass of yttrium represents from 0.1% to 2% of the mass of the alloy.

Preferably, the mass of manganese represents between 1.3% and 5% of the mass of the alloy, preferably also, between 2% and 3.5% of the mass of the alloy.

Preferably, the mass of yttrium represents between 0.2% and 1% of the mass of the alloy, preferably also, between 0.2% and 0.7% of the mass of the alloy.

According to an embodiment, the invention relates to a composition for a negative electrode of a nickel metal hydride alkaline battery, comprising:

a) a cobalt-free hydrogen-fixing alloy corresponding to the formula:

$$R_{1-t}Mg_tNi_{s-x-y-u}Mn_xAl_yM_u, \text{ where}$$

R represents at least one element chosen from the group comprising La, Ce, Nd and Pr;

M represents at least one element chosen from the group comprising Fe, Cu, Zr and Sn;

with $0.1 \leq t \leq 0.25$
$x \leq 0.20$
$y \leq 0.20$
$u \leq 0.20$
$x+y+u \leq 0.5$
$3.5 \leq s \leq 3.8$ b) a manganese compound in a proportion such that the mass of manganese represents from 1 to 5.5% of the mass of alloy, c) an yttrium compound in a proportion such that the mass of yttrium represents from 0.1% to 2% of the mass of the alloy.

Preferably, the mass of manganese represents between 1.3% and 5% of the mass of the alloy, preferably also, between 2% and 3.5% of the mass of the alloy.

Preferably, the mass of yttrium represents between 0.2% and 1% of the mass of the alloy, preferably also, between 0.2% and 0.7% of the mass of the alloy.

The composition of the alloy can be confirmed by elementary analysis by the inductively coupled plasma technique or by the atomic absorption technique or the X-ray fluorescence technique.

According to a preferred embodiment, the equilibrium hydrogen pressure with the hydrogen-fixing alloy $R_{1-t}Mg_tNi_{s-z}M_z$, at 40° C., for 1% by mass of hydrogen inserted, is less than 1.5 bar. The hydrogen pressure is not inherent to the composition of the hydrogen-fixing alloy but to the composition of the phase which absorbs the hydrogen. For the same alloy composition, different processing methods, in particular different heat treatments, can lead to the obtaining of a monophased alloy or of a multiphased alloy the composition of none of the phases of which is identical to that of the alloy.

According to a preferred embodiment, the hydrogen-fixing alloy $R_{1-t}Mg_tNi_{s-z}M_z$ is mostly constituted by $A_2B_7$ type crystalline phases (hexagonal of $Ce_2Ni_7$ type or rhombohedral of $Gd_2Co_7$ type), $A_5B_{19}$ (rhombohedral of $Ce_5Co_{19}$ type or hexagonal of $Ce_5Ni_{19}$ type), or a mixture of these crystalline phases.

The alloy of the invention can be processed:

a) by melting and
slow freezing (standard metallurgy)
quenching (rapid freezing) such as "strip casting" on a single roller or between double rollers
solution annealing (ultra-rapid cooling) using the "melt spinning" or "planar flow casting" technique on a single roller or between double rollers b) by powder metallurgy (sintering) starting with
pure elements
prealloys,
c) by mechanosynthesis.

The alloy of the invention may have undergone annealing.

According to an embodiment, the size of the hydrogen-fixing alloy particles is characterized by a $Dv_{50\%}$ of 30 to 120 µm, preferably of 50 to 100 µm.

The mixture of the alloy with a manganese compound has the effect of preventing or delaying the appearance of micro short circuits attributed to deposits of cobalt originating from the positive electrode or from the negative electrode, in the separator during the cycling of the battery. These micro short circuits in fact generate an exacerbated self-discharge which has the effect of accelerating the reduction in the capacity restored after discharge. Without wishing to be bound by theory, the Applicant thinks that the presence of manganese leads to the precipitation of mixed cobalt and manganese compounds which are less conductive than deposits of cobalt.

It is therefore preferable to reduce the level of cobalt in the electrochemical cell and the level of manganese must be greater than 1% with respect to the mass of alloy in order for the effect of the presence of manganese to be significant. On the other hand, when the level of manganese increases in the electrode, the quantity of material not absorbing hydrogen or absorbing a quantity of hydrogen less than that of the alloy $R_{1-t}Mg_tNi_{s-z}M_z$, increases to the detriment of the quantity of the alloy $R_{1-t}Mg_tNi_{s-z}M_z$, which leads to a reduction in the capacity of the electrode.

The proportion by mass of manganese in the negative electrode must therefore be limited to 5.5% of the mass of hydrogen-fixing alloy.

The compound based on manganese is chosen from a non-exhaustive list comprising oxides such as MnO, $MnO_2$, or a hydroxide or a manganese-based salt. Preferably, the compound based on manganese is the oxide MnO. The manganese compound can be also an $AB_5$ type hydrogen-fixing alloy comprising manganese in which:

A comprises one or more elements chosen from the group of the lanthanides;

B comprises one or more elements chosen from the group comprising Ni, Co, Mn and Al.

The mixture of the hydrogen-fixing alloy with an yttrium-based compound has the effect of increasing the lifetime of the anode.

The yttrium-based compound is chosen from a non-exhaustive list comprising an yttrium oxide such as $Y_2O_3$, an yttrium hydroxide such as $Y(OH)_3$ or an yttrium salt. Preferably, the yttrium-based compound is yttrium oxide $Y_2O_3$.

The yttrium-based compound is mixed with the alloy in a proportion such that the mass of yttrium represents from 0.1% to 2% of the mass of the alloy, preferably from 0.2% to 1% of the mass of alloy, again preferably from 0.2% to 0.7% mass of the mass of the alloy.

The process of addition of the manganese- and yttrium-based compounds to the active material during the production of the anode is simple to implement industrially. It does not require complex devices. As can be noted, the solution according to the invention is effectively very simple and/or does not represent any notable additional cost.

The invention also relates to an anode comprising said composition: The anode is produced by pasting a support with a paste constituted by an aqueous mixture of the composition according to the invention and optionally additives. The support can be a nickel foam, a flat or three-dimensional perforated strip made of nickel or nickel-plated steel.

The additives are intended to facilitate the utilization of the anode or to improve its performances. They can be thickening agents such as carboxymethylcellulose (CMC), hydroxypropylmethylcellulose (HPMC), polyacrylic acid (PAAc), xanthan gum, poly(ethyleneoxide) (PEO). They can also be binders such as butadiene-styrene (SBR) copolymers, polystyrene acrylate (PSA), ethylene-vinyl acetate copolymer, polytetrafluoroethylene (PTFE). They can also be polymer fibres, such as polyamide, polypropylene, polyethylene, etc. in order to improve the mechanical properties of the electrode. They can also be conductive agents such as nickel powder, carbon powder or carbon fibres, nanotubes.

Advantageously, the anode is covered with a surface layer intended to improve the high level of discharge and/or the recombination of the oxygen at the end of charging.

The invention also proposes an anode (negative electrode) for a battery, produced from said composition.

The invention also proposes a nickel metal hydride battery comprising said anode. This battery typically comprises said at least one anode, at least one nickel cathode, at least one separator and an alkaline electrolyte.

The cathode is constituted by the cathode active mass deposited on a support which can be a sintered support, a nickel foam, a flat or three-dimensional perforated strip made of nickel or nickel-plated steel.

The cathode active mass comprises the cathode active material and optionally additives intended to facilitate its utilization or its performances. The cathode active material is a nickel hydroxide $Ni(OH)_2$ which can be partially substituted by cobalt, magnesium, cadmium and zinc. This hydroxide can be partially oxidized and can be coated with a surface layer based on cobalt compounds.

Among the additives, there can be mentioned, without this list being exhaustive, carboxymethylcellulose (CMC), hydroxypropylmethylcellulose (HPMC), hydroxypropylcellulose (HPC), hydroxyethylcellulose (HEC), xanthan gum, polyacrylic acid (PAAc), polystyrene maleic anhydride (SMA), the copolymers of butadiene-styrene (SBR) optionally carboxylated, a copolymer of acrylonitrile and butadiene (NBR), a copolymer of styrene, ethylene, butylene and styrene (SEBS), a terpolymer of styrene, butadiene and vinylpyridine (SBVR), polystyrene acrylate (PSA), polytetrafluoroethylene (PTFE), a fluorinated copolymer of ethylene and propylene (FEP), polyhexafluoropropylene (PPHF), the ethylene vinyl acetate (EVA) copolymer, zinc oxide ZnO, fibres (Ni, C, polymers), powders of cobalt-based compounds such as Co, $Co(OH)_2$, CoO, $Li_xCoO_2$, $H_xCoO_2$ and $Na_xCoO_2$.

The separator is generally composed of polyolefin fibres (for example polypropylene) or non-woven porous polyamide.

The electrolyte is a concentrated alkaline aqueous solution comprising at least one hydroxide (KOH, NaOH, LiOH), at a concentration generally of the order of several times normality.

In standard fashion, the electrode pastes are prepared, the electrodes are produced, then at least one cathode, one separator and one anode are superimposed in order to constitute the electrochemical bundle. The electrochemical bundle is introduced into a container and impregnated with an aqueous alkaline electrolyte. The battery is then closed.

The invention relates to any battery format: prismatic format (flat electrodes) or cylindrical format (spiral or concentric electrodes).

The battery according to the invention can be of the open or semi-open type or of the sealed type.

The battery according to the invention is particularly well suited as an energy source for an electric vehicle or a portable device.

Other characteristics and advantages of the present invention will become apparent on reading the examples.

EXAMPLES

The alloys A, B and X the compositions of which are shown in Table 1, were prepared by a rapid cooling process, and annealed at temperatures comprised between 1000 and 1100° C., for a period comprised between 1 h and 10 h.

The alloy B contains no cobalt, unlike the alloy A.

The alloy X is an $AB_5$ type alloy, used as a source of manganese.

TABLE 1

| Elemental composition of the alloys | | | | | | | | | | |
|---|---|---|---|---|---|---|---|---|---|---|
| Reference | La | Ce | Nd | Pr | Mg | Ni | Mn | Al | Co | t |
| A | 0.19 | 0 | 0.21 | 0.45 | 0.15 | 3.29 | 0 | 0.05 | 0.15 | 3.49 |
| B | 0.19 | 0 | 0.21 | 0.45 | 0.15 | 4.02 | 0 | 0.05 | 0 | 3.53 |
| X | 0.78 | 0.15 | 0.05 | 0.01 | 0 | 4.25 | 0.60 | 0.19 | 0.24 | 5.29 |

TABLE 2

Composition of the active material of the negative electrode of the cells studied and associated performances

| Cell | a | b | c | d | e | f | g | h |
|---|---|---|---|---|---|---|---|---|
| Alloy Reference | A | B | A | A | B | A | A | A |
| $R_{1-x}Mg_xNi_{5-z}M_z$ % | 99.6 | 99.6 | 97.8 | 79.6 | 97.8 | 98.1 | 98.7 | 92.6 |
| MnO (%) | 0 | 0 | 1.8 | 0 | 1.8 | 0.9 | 1.8 | 7 |
| $Y_2O_3$ (%) | 0.4 | 0.4 | 0.4 | 0.4 | 0.4 | 0.4 | 0.1 | 0.4 |
| Alloy X (%) | 0 | 0 | 0 | 20 | 0 | 0 | 0 | 0 |
| Mass Mn/mass of alloy (%) | 0 | 0 | 1.39 | 1.51 | 1.39 | 0.70 | 1.39 | 5.86 |
| Initial capacity $D°_{0h}$ (mAh) | 2997 | 3039 | 3033 | 3009 | 3017 | 3024 | 2950 | 2760 |
| Initial self-discharge $SD°$ (%) | 14.1 | 14.2 | 13.5 | 13.7 | 13.6 | 13.7 | 13.5 | 13.4 |
| Capacity at 500 cycles $D^{500}_{0h}$ (mAh) | 2998 | 2924 | 3054 | 3059 | 3024 | 3045 | 2280 | 2712 |
| Self-discharge at 500 cycles $SD^{500}$ (%) | 28.4 | 18.4 | 13.4 | 13.7 | 13.8 | 26.2 | 13.7 | 13.6 |

Sealed electrochemical cells of format Cs with a capacity of 3.0 Ah were produced with the abovementioned alloys. Table 2 summarizes the characteristics of the negative electrodes of these cells.

The active material of the negative electrode of the cell 'a' contains the alloy A and 0.4% $Y_2O_3$.

The active material of the negative electrode of the cell 'b' contains the alloy B and 0.4% $Y_2O_3$.

The cells 'a' and 'b' are not part of the invention as the active materials of the negative electrode of these cells contain no manganese.

The active material of the negative electrode of the cell 'c' contains the alloy A, 0.4% to $Y_2O_3$ and 1.8% MnO.

The active material of the negative electrode of the cell 'd' contains 79.6% alloy A, 20% alloy X as source of manganese and 0.4% $Y_2O_3$.

The active material of the negative electrode of the cell 'e' contains the alloy B, 0.4% $Y_2O_3$ and 1.8% MnO.

The cells 'c', 'd' and 'e' are part of the invention.

The active material of the negative electrode of the cell 'f' contains the alloy A, 0.4% $Y_2O_3$ and 0.9% MnO. The cell 'f' is not part of the invention as the mass of manganese present in the negative electrode is too small.

The active material of the negative electrode of the cell 'g' contains the alloy A, 0.1% $Y_2O_3$ and 1.8% MnO. The cell 'g' is not part of the invention as the mass of yttrium present in the negative electrode is too small.

The active material of the negative electrode of the cell 'h' contains the alloy A, 0.4% $Y_2O_3$ and 7% MnO (i.e. 5.86% Mn with respect to the mass of alloy). The cell 'h' is not part of the invention as the mass of manganese is too great.

The negative electrodes were produced as follows: a paste constituted by an aqueous mixture of alloy powder, CMC (thickening agent), SBR (binder), carbon (conductor) is pasted in a nickel foam. All the negative electrodes are cut to the same dimensions. Yttrium was added in the form of yttrium oxide at a rate of 0.4% by mass (i.e. 0.315% yttrium with respect to the mass of hydrogen-fixing alloy). Manganese is added in the form of the oxide MnO.

The positive electrode is a standard foam electrode containing a nickel-based hydroxide and a conductive compound $Co(OH)_2$.

The bundle constituted by the positive electrode, the separator and the negative electrode, is spirally wound and introduced into the container. The connector cells are then mounted. The container is filled with ternary 9N electrolyte KOH, NaOH, LiOH. The container, the separator, the connector cells and the electrolyte are the same as in the cells of production format Cs.

The cells first undergo 2 cycles each comprising:
charging for 16 hours at a current of 0.3 A,
rest for one hour,
discharging at a current of 0.6 A up to a cut-off voltage of 0.9V.

The cells are then charged at a rate of C/2 for 2 h 24 min.

A measurement of capacity at the discharge rate of C/5 (0.6 A) up to a cut-off voltage of 0.9V is then carried out on each cell.

The cells then undergo charging for 2 h 24 min with a current of C/2 and are left at rest for 24 h at 40° C. The capacity discharged at a discharge rate of C/5, and at a cut-off voltage of 0.9V is measured. This measurement makes it possible to calculate a reference self-discharge percentage equal to $SD°=(1-D_{24\,h}/D_{0\,h})*100$ where $D_{24\,h}$ represents the capacity discharged after resting for 24 h at 40° C. and $D_{0\,h}$ the capacity discharged without this rest period. The capacities measured during these discharges and the reference self-discharge percentages are shown in Table 2.

The cells then undergo a prolonged cycling at 20° C. comprising phases of discharge of the cells up to 80% of their capacity. (Depth of discharge 80%). Each cycling cycle is constituted by:
a charge for 2 h 24 min at a rate of C/3,
a discharge at a rate of C limited to 48 min or
by a voltage of less than 0.9V and
rest for 15 min.

Periodically, during the cycling, the capacity of the cells is measured under conditions of discharge at C/5 for a cut-off voltage of 0.9V, after charging for 2 h 24 min at a rate of C/2, followed or not followed by a rest period of 24 h at 40° C. The percentage of self-discharge at the $n^{th}$ cycle is $SD^n=(1-D''_{24\,h}/D''_{0\,h})*100$ where $D''_{24\,h}$ and $D''_{0\,h}$ respectively designate the capacity discharged after resting for 24 h at 40° C. and the capacity discharged without this rest period.

Thus, the self-discharge percentage $SD^n$ during the $n^{th}$ cycle, can be evaluated in a similar fashion to the initial self-discharge percentage $SD°$, i.e. measured before the cycling starts.

Results

Examination of Table 2 shows that the initial electrochemical capacities of the cells 'a' to 'g', i.e. before cycling starts, are comprised between 2950 and 3050 mAh. The cell 'h' has an initial electrochemical capacity of only 2760 mAh due to too great a presence of manganese. The mass of manganese oxide added to the cell 'h' is in fact equal to 7% of the active mass (i.e. 7.56% of the mass of hydrogen-fixing alloy or 5.86% of manganese with respect to the mass of the hydrogen-fixing alloy), After 500 cycles, the capacities of the cells 'a' to 'f' remain greater than 2900 mAh), i.e. a reduction in capacity of less than 5%. On the other hand, the cell 'g', for which the level of yttrium oxide added to the negative electrode is 0.1%, (i.e. 0.08% yttrium with respect to the mass of alloy) has a capacity after 500 cycles equal to 2280 mAh, which represents only 77% of its initial capacity. The presence of at least 0.1% yttrium with respect to the mass of alloy is therefore necessary in order to obtain a long lifetime of the cell.

The capacity of the cell 'h' after 500 cycles is 2712 mAh, which represents more than 98% of its initial capacity.

The self-discharge value over 24 h at 40° C. in the initial state, i.e. before cycling starts, is approximately 14% for all the cells. After 500 cycles, it is increased to more than 25% in the case of the cell 'a' (without Mn and the alloy A of which contains a level of 0.15% cobalt) as well as in the case of the cell 'f' for which the mass of manganese added represents less than 1% of the mass of alloy. Without a supply of manganese, the self-discharge after 500 cycles is increased to approximately 18% when the hydrogen-fixing alloy of the negative electrode is free of Co as shown by the result obtained with the cell 'b'. In the presence of manganese in the negative electrode in a proportion greater than 1.0% of the mass of alloy, whether in the form of MnO or of alloy X, the self-discharge after 500 cycles remains practically unchanged with respect to the initial self-discharge (cells 'c' to 'e', and 'g', 'h'). It remains close to 14%.

Thus, the cells 'c', 'd' and 'e' according to the invention have initial capacities equal to 3000±50 mAh and capacities after 500 cycles greater than 2400 mAh. This corresponds to a loss in capacity of less than 20% of the initial capacity based on an initial capacity of 3000 mAh. The cells 'c', 'd' and 'e' according to the invention also have self-discharge levels of less than 15% after 500 cycles unlike the cells 'a', 'b', and 'f' to 'h' the active material of the negative electrode of which is outside the scope of the invention. The cells 'c', 'd' and 'e' therefore have a longer lifetime and a lower self-discharge after cycling.

The invention claimed is:

1. An alkaline electrolyte battery comprising at least one anode comprising a composition comprising a mixture of:
   a) a first hydrogen-fixing alloy of formula $R_{1-t}Mg_tNi_{s-z}M_z$ in which:
   R represents one or more elements chosen from the group comprising La, Ce, Nd and Pr;
   M represents one or more elements chosen from the group comprising Mn, Fe, Al, Co, Cu, Zr and Sn;
   $0.1 \leq t \leq 0.4$;
   $3.0 \leq s \leq 4.3$;
   $z \leq 0.5$;
   b) particles of a manganese compound in a proportion such that the mass of manganese represents between 1.3 and 5.5% of the mass of the alloy,
   c) an yttrium compound in a proportion such that the mass of yttrium represents from 0.1% to 2% of the mass of the alloy.

2. The alkaline electrolyte battery according to claim 1, in which $0.1 \leq t \leq 0.25$ and $3.5 \leq s \leq 3.8$.

3. The alkaline electrolyte battery according to claim 2, in which $M = Mn_xAl_yM'_u$ where:
   M' represents one or more elements chosen from the group comprising Fe, Co, Cu, Zr and Sn;
   $x \leq 0.20$;
   $0.05 \leq y \leq 0.20$;
   $u \leq 0.20$ and
   $x+y+u \leq 0.5$.

4. The alkaline electrolyte battery according to claim 1, in which the hydrogen-fixing alloy is cobalt-free.

5. The alkaline electrolyte battery according to claim 2, in which the hydrogen-fixing alloy is cobalt-free.

6. The alkaline electrolyte battery according to claim 5, in which $M = Mn_xAl_yM'_u$ where:

M' represents one or more elements chosen from the group comprising Fe, Cu, Zr and Sn;
   $x \leq 0.20$;
   $y \leq 0.20$;
   $u \leq 0.20$ and
   $x+y+u \leq 0.5$.

7. The alkaline electrolyte battery according to claim 1, in which the mass of yttrium represents between 0.2% and 1% of the mass of the alloy.

8. The alkaline electrolyte battery according to claim 1, in which the equilibrium hydrogen pressure with the alloy, for 1% by mass of hydrogen inserted, is less than 1.5 bar.

9. The alkaline electrolyte battery according to claim 1, in which the yttrium compound is yttrium oxide $Y_2O_3$.

10. The alkaline electrolyte battery according to claim 1, in which the manganese-based compound is manganese oxide MnO.

11. The alkaline electrolyte battery according to claim 1, in which the manganese compound is a second hydrogen-fixing alloy.

12. The alkaline electrolyte battery according to claim 11, in which the second hydrogen-fixing alloy is of $AB_5$ type where:
   A comprises one or more elements chosen from the group of lanthanides;
   B comprises one or more elements chosen from the group comprising Ni, Co, Mn and Al.

13. The alkaline electrolyte battery according to claim 1, in which the size of the hydrogen-fixing alloy particles is characterized by a $Dv_{50}\%$ of 30 to 120 μm.

14. The alkaline electrolyte battery according to claim 1, in which the mass of manganese represents between 2% and 3.5% of the mass of the alloy.

15. The alkaline electrolyte battery according to claim 7, in which the mass of yttrium represents between 0.2% and 0.7% of the mass of the alloy.

16. The alkaline electrolyte battery according to claim 13, in which the size of the hydrogen-fixing alloy particles is characterized by a $Dv_{50}\%$ of 50 to 100 μm.

17. The alkaline electrolyte battery according to claim 1, wherein the particles of the manganese compound are in a proportion such that the mass of manganese represents between 1.3 and 5% of the mass of the alloy.

* * * * *